(12) United States Patent
Glaß et al.

(10) Patent No.: US 12,351,042 B2
(45) Date of Patent: Jul. 8, 2025

(54) TRACTION NETWORK AND METHOD FOR CONTROLLING A TRACTION NETWORK OF AN ELECTRIC OR HYBRID VEHICLE

(71) Applicant: VOLKSWAGEN AKTIENGESELLSCHAFT, Wolfsburg (DE)

(72) Inventors: Sascha Glaß, Magdeburg (DE); Florian Quantmeyer, Wolfenbüttel (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 175 days.

(21) Appl. No.: 18/355,131

(22) Filed: Jul. 19, 2023

(65) Prior Publication Data
US 2024/0025260 A1    Jan. 25, 2024

(30) Foreign Application Priority Data
Jul. 19, 2022    (DE) ...................... 10 2022 207 363.0

(51) Int. Cl.
*B60L 3/00*    (2019.01)
*B60L 3/04*    (2006.01)

(52) U.S. Cl.
CPC ............... *B60L 3/04* (2013.01); *B60L 3/0046* (2013.01); *B60L 2210/10* (2013.01)

(58) Field of Classification Search
CPC ...... B60L 3/04; B60L 3/0046; B60L 2210/10; B60L 3/0092; B60L 58/20; B60L 58/10; B60L 58/18; B60L 3/00; Y02T 10/70

USPC .......................................................... 701/22
See application file for complete search history.

(56) References Cited

U.S. PATENT DOCUMENTS

| | | | | |
|---|---|---|---|---|
| 2014/0244082 | A1* | 8/2014 | Caron | B60L 50/61 |
| | | | | 290/40 R |
| 2019/0337403 | A1* | 11/2019 | Tanaka | H01M 8/04228 |
| 2023/0249520 | A1* | 8/2023 | Turudic | B60H 1/00385 |
| | | | | 165/201 |

FOREIGN PATENT DOCUMENTS

EP       2720900 A2    4/2014

* cited by examiner

*Primary Examiner* — Shardul D Patel
(74) *Attorney, Agent, or Firm* — BARNES & THORNBURG LLP

(57) ABSTRACT

A traction power supply system of an electric or hybrid transportation vehicle having a high-voltage side and a low-voltage side, wherein at least one electrical machine, an inverter and a high-voltage battery are arranged on the high-voltage side, wherein the high-voltage side is connected to the low-voltage side via at least one DC-DC converter, wherein the high-voltage battery is assigned at least one switching element, wherein the traction power supply system has at least one control device which controls the switching element, wherein the at least one switching element is arranged in at least one connection line between the high-voltage battery and the inverter, wherein the high-voltage battery is connected to the DC-DC converter via at least one further connection line. Also disclosed is a method for controlling a traction power supply system.

19 Claims, 5 Drawing Sheets

TRACTION NETWORK AND METHOD FOR CONTROLLING A TRACTION NETWORK OF AN ELECTRIC OR HYBRID VEHICLE

PRIORITY CLAIM

This patent application claims priority to German Patent Application No. 10 2022 207 363.0, filed 19 Jul. 2022, the disclosure of which is incorporated herein by reference in its entirety.

SUMMARY

Illustrative embodiments relate to a traction power supply system and a method for controlling a traction power supply system of an electric or hybrid transportation vehicle.

BRIEF DESCRIPTION OF THE DRAWINGS

Disclosed embodiments are explained in more detail below with reference to the drawings, in which.

DETAILED DESCRIPTION

Figure 1:
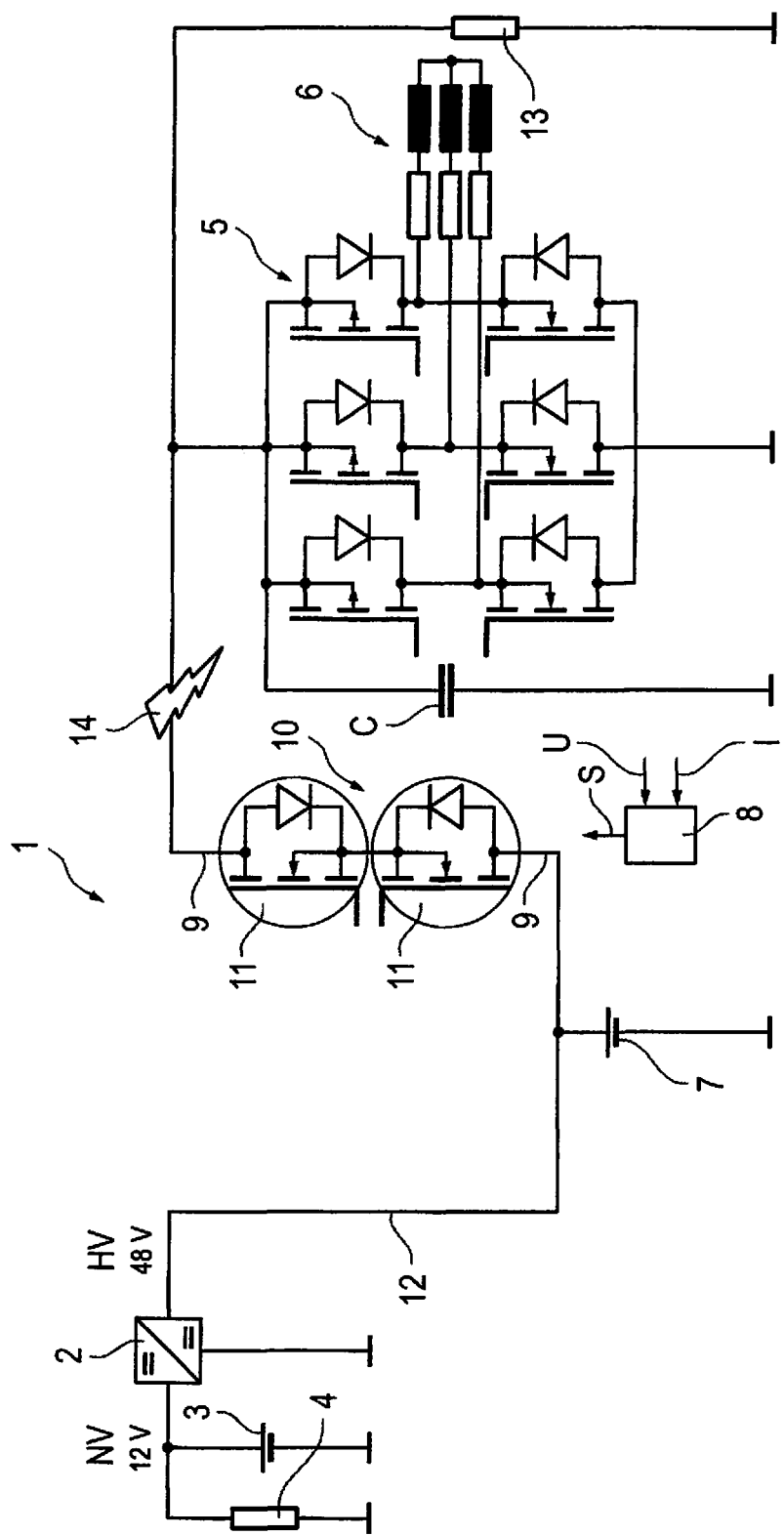
FIG. 1 is a first exemplary embodiment of a traction power supply system.

Traction power supply systems for electric or hybrid transportation vehicles comprise a high-voltage side and a low-voltage side, wherein the low-voltage side is the classic on-board electrical system which typically has a voltage level of 12 V and is responsible for supplying power to control devices and other low-voltage loads. Compared with the low-voltage side, the high-voltage side has a higher voltage level. Hybrid transportation vehicles are known here where the high-voltage side is, for example, 24 V. 36 V or 48 V, that is to say below 60 V, from which contact protection measures are taken. In the case of electric transportation vehicles, however, the high-voltage side is typically well above 60 V, wherein the voltage level of the high-voltage side is, for example, between 400 V and 800 V. In the context of this disclosure, high-voltage side generally denotes a voltage level higher than that on the low-voltage side. At least one electrical machine, an inverter and a high-voltage battery are arranged on the high-voltage side, wherein the drive torque is generated via the electrical machine. The high-voltage side and the low-voltage side can be connected via a DC-DC converter such that the high-voltage side can also supply electrical power to the low-voltage side. The high-voltage battery is typically assigned at least one switching element by which the high-voltage battery is disconnected from the rest of the traction power supply system. This may be the case, for example, in the event of a fault of the electrical machine. For this purpose, the traction power supply system has at least one control device which controls the switching element.

A traction power supply system of this kind is known, for example, from US 2019/0337403 A1. That document further proposes to arrange a low-voltage battery on the low-voltage side. It further discloses a fuel cell which is connected to the high-voltage battery via a further DC-DC converter and is connected to the low-voltage side via yet a further DC-DC converter. In the event of a fault, that is to say if the high-voltage battery is switched off, the fuel cell is then additionally available for supplying power to the low-voltage side having the low-voltage battery. The traction power supply system disclosed in that document is however relatively complex.

The disclosed embodiments are based on the technical problem of providing a traction power supply system which ensures the electrical power supply to the low-voltage side using simple methods or mechanisms, and of making available a corresponding method.

The technical problem is solved by way of a traction power supply system and a method.

The traction power supply system of an electric or hybrid transportation vehicle comprises a high-voltage side and a low-voltage side, wherein at least one electrical machine, an inverter and a high-voltage battery are arranged on the high-voltage side, wherein the high-voltage side is connected to the low-voltage side via at least one DC-DC converter, wherein the high-voltage battery is assigned at least one switching element, wherein the traction power supply system has at least one control device which controls the switching element. In this case, the at least one switching element is arranged in a connection line between the high-voltage battery and the inverter, wherein the high-voltage battery is connected to the DC-DC converter via a further connection line. As a result, in the event of a defect in the electrical machine and/or in the inverter, the defective part of the traction power supply system can be switched off and the low-voltage side can still be supplied with power by the high-voltage battery via the DC-DC converter. Provision can be made here for a low-voltage battery to be arranged on the low-voltage side. Furthermore, further high-voltage loads can be arranged on the high-voltage side which are then likewise disconnected along with the inverter and/or the electrical machine. Provision can also be made here for the inverter and the electrical machine to also be switched off in the event of a fault of a high-voltage load. However, provision can also be made for the high-voltage loads to be assigned their own switching element such that it is possible to switch off the high-voltage loads and the inverter independently of one another. The control device which controls the switching element is, for example, a battery management control device of the high-voltage battery, which battery management control device, for example, receives data from current and/or voltage sensors. In the case of high-voltage batteries having nominal voltages of less than/equal to 60 V, the switching off may take place in a single-pole manner, wherein in the case of nominal voltages of greater than 60 V, the switching off takes place in an all-pole manner, that is to say two switching elements for plus and minus pole are provided.

In at least one exemplary embodiment, a further switching element is arranged in the at least one further connection line to the DC-DC converter such that, in the event of a defect of the high-voltage battery, the high-voltage battery can also be disconnected from the DC-DC converter. With regard to the single- or all-pole switching off, reference can be made here to the preceding statements.

In a further exemplary embodiment, the DC-DC converter is designed to be bidirectional such that an intermediate circuit capacitor of the inverter can be precharged, for example, from the low-voltage side.

In a further exemplary embodiment, a third connection line is arranged between the DC-DC converter and the inverter, wherein at least one third switching element is arranged in the third connection line. As a result, the desired precharging of the intermediate circuit capacitor can take place, wherein, in the event of a defect of the inverter, of the electrical machine or of another high-voltage load, the DC-DC converter can be disconnected from the defective components. Via this third connection line, mechanical energy of the electrical machine can additionally be used to support the low-voltage side. If, for example, a defective high-voltage battery has to be switched off, the electrical machine can be operated as a generator. This additionally improves the fail-safety of the low-voltage side.

In a further exemplary embodiment, the switching elements are designed as relays such that galvanic isolation is achieved which is beneficial, in particular, in the case of high-voltage batteries having a nominal voltage of greater than 60 V.

In an alternative exemplary embodiment, the switching elements are designed as MOSFETs, wherein at least the at least one switching element and the further switching element are cache designed as two MOSFETs connected in series in opposite directions such that the flow of current is prevented via the parasitic diodes of the MOSFETs.

In at least one exemplary embodiment, the high-voltage battery has a nominal voltage of greater than 12 V and less than 60 V, in particular, a nominal voltage of 24 V, 36 V or 48 V.

In another exemplary embodiment, the high-voltage battery has a nominal voltage of greater than 60 V, in particular, greater than/equal to 380 V.

With regard to the configuration of the method, reference is made to the preceding statements in full.

FIG. 1 illustrates a traction power supply system 1 for a hybrid transportation vehicle, wherein the traction power supply system 1 has a low-voltage side NV and a high-voltage side HV which are connected to each other via a bidirectional DC-DC converter 2. A low-voltage battery 3 and an exemplary low-voltage load 4 are arranged on the low-voltage side NV, wherein the low-voltage side NV has a voltage level of 12 V. An inverter 5 (consisting of three half bridges) and an electrical machine 6 are arranged on the high-voltage side HV, wherein the electrical machine 6 is illustrated by three resistors and three inductances. An intermediate circuit capacitor C is arranged in parallel with the inverter 5. Furthermore, a high-voltage battery 7 having a nominal voltage of 48 V is arranged on the high-voltage side HV, wherein the high-voltage battery 7 is connected to the inverter 5 via a connection line 9, wherein a switching element 10 is arranged in the connection line 9, wherein the switching element 10 is formed by two MOSFETs 11 connected in series in opposite directions, wherein the parasitic diodes thereof are additionally illustrated. The MOSFETs 11 are controlled by a control device 8, wherein the control device 8 receives voltage values U and current values I from voltage and current sensors that are not illustrated. The high-voltage battery 7 is connected to the DC-DC converter 2 via a further connection line 12. Furthermore, an exemplary high-voltage load 13 is illustrated. If the control device 8 now detects a defect 14 on the high-voltage side HV (e.g., a short circuit, a defect of the electrical machine 6 and/or of the inverter 5, a defect of the high-voltage load 13 having a repercussion on the rest of the traction power supply system), the control device 8 generates control signals S for the MOSFETs 11 to turn them off. These defects 14 thus no longer have any repercussion on the high-voltage battery 7 such that the latter can continue to supply power to the low-voltage side NV via the DC-DC converter 2.

Figure 2:
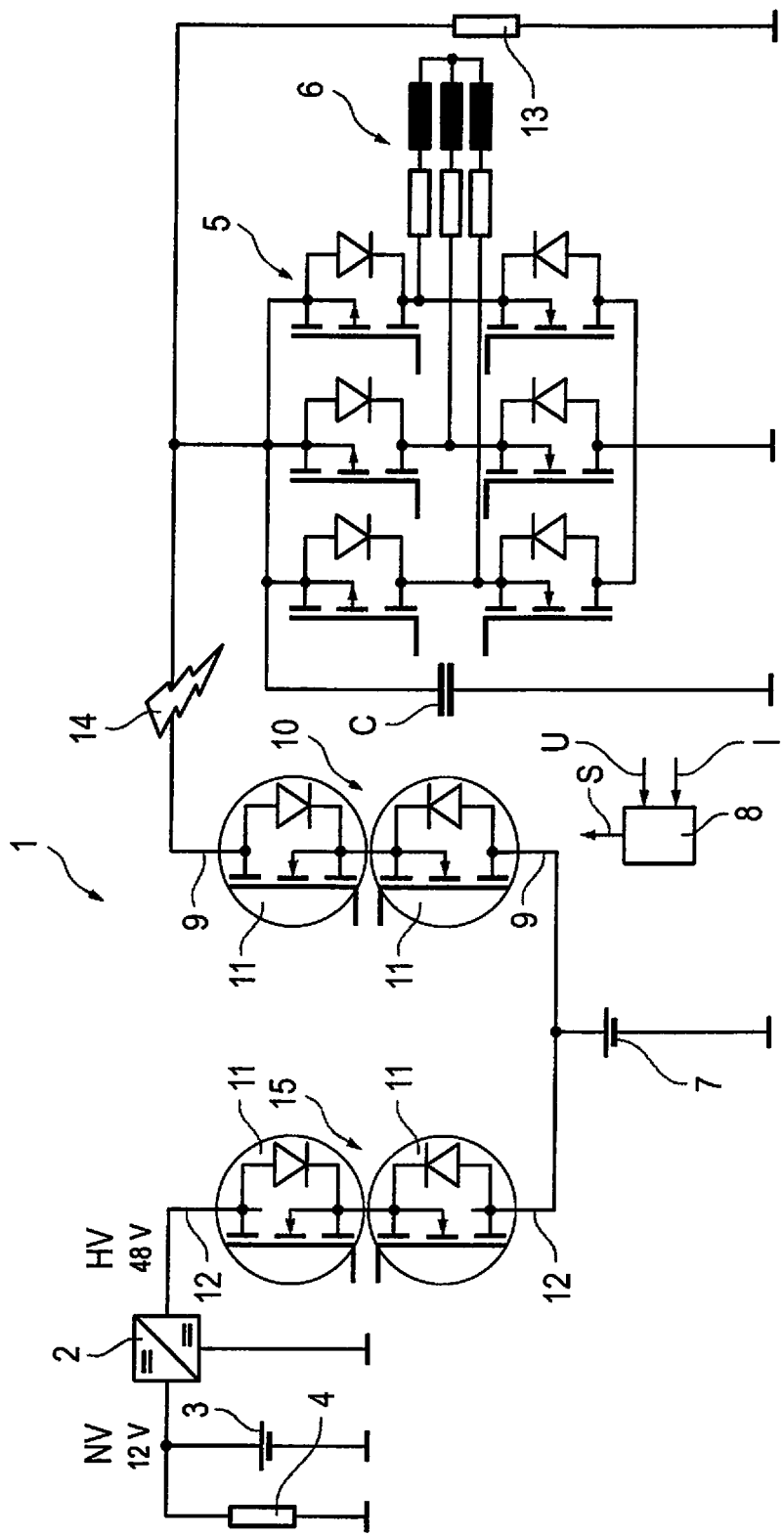
FIG. 2 is a second exemplary embodiment of a traction power supply system.

FIG. 2 illustrates an exemplary embodiment for a traction power supply system, wherein the only difference to the disclosed embodiment according to FIG. 1 is that a further switching element 15, consisting of two MOSFETs 11 connected in series in opposite directions, is arranged in the further connection line 12. As a result, a defective high-voltage battery 7 can additionally be disconnected from the DC-DC converter 2 to thus prevent repercussions on the low-voltage side NV.

Figure 3:
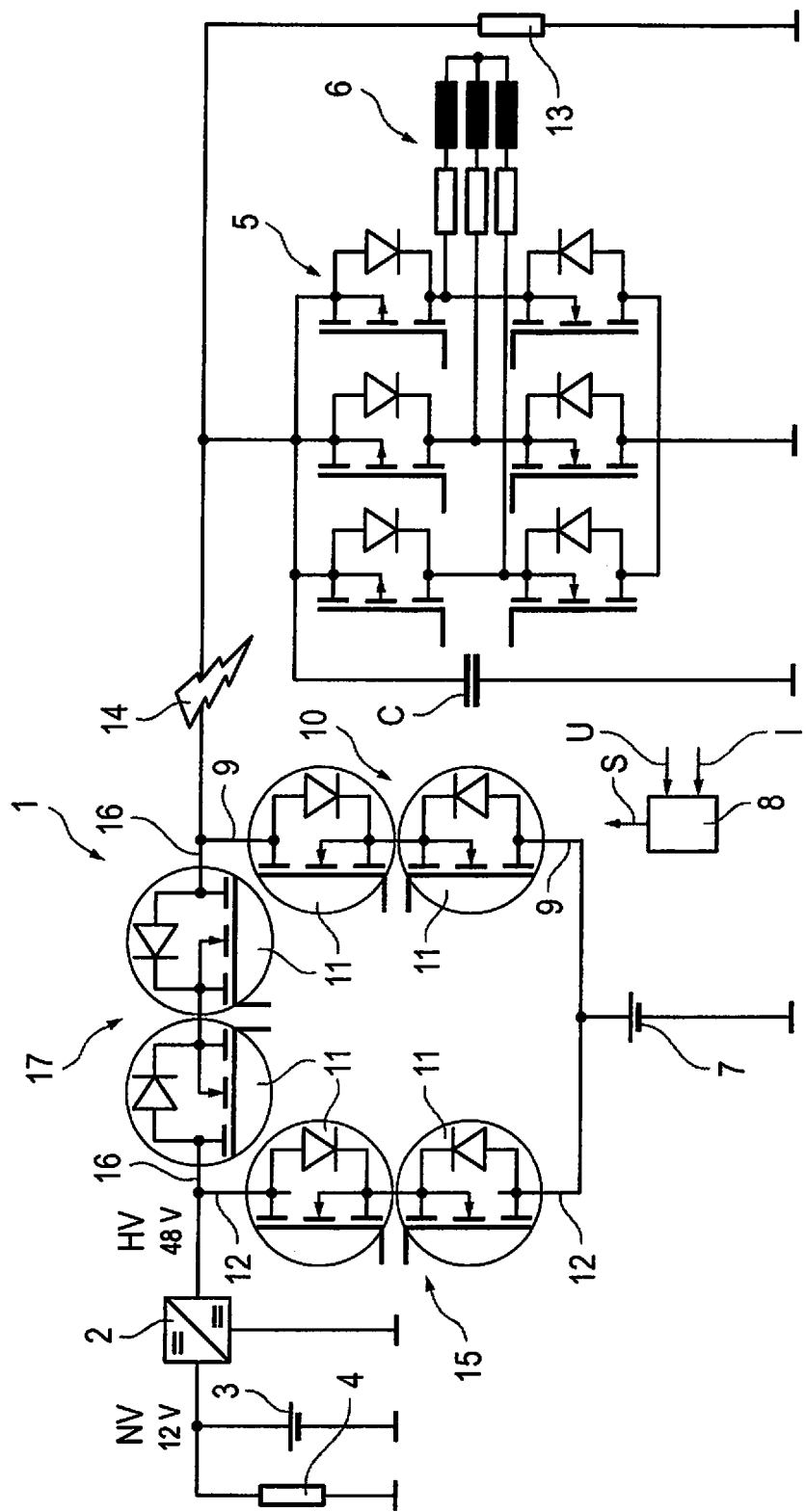
FIG. 3 is a third exemplary embodiment of a traction power supply system.

FIG. 3 illustrates a further exemplary embodiment for a traction power supply system 1, wherein the only difference to the disclosed embodiment according to FIG. 2 is that there is a third connection line 16 between the DC-DC converter 2 and the inverter 5 or the intermediate circuit capacitor C, wherein a third switching element 17 composed of two MOSFETs 11 is arranged in the third connection line 16. If the switching elements 10, 15 are open, the low-voltage side NV can precharge the intermediate circuit capacitor C via the third connection line 16 before the high-voltage battery 7 is switched on such that current peaks are avoided. The electrical machine 6 can additionally support the low-voltage side NV via the inverter 5 via the third connection line 16 if a defective high-voltage battery 7 has to be switched off (switching elements 10, 15 turn off or are open). In the event of a defect of the electrical machine 6, of the inverter and/or of the high-voltage load 13, the switching element 17 is turned off (or opened) just like the switching element 10 to thus avoid repercussions.

Figure 4:
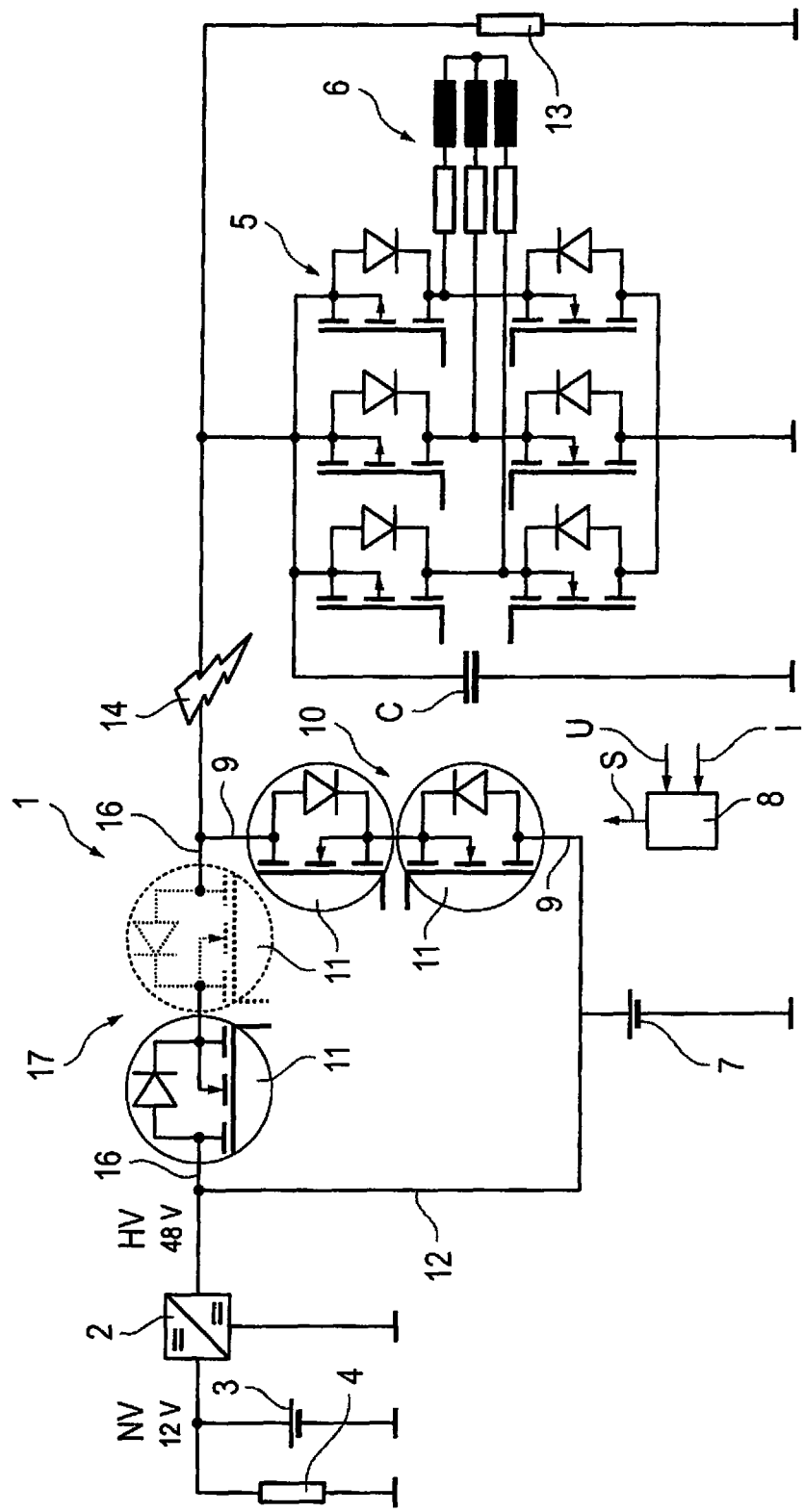
FIG. 4 is a fourth exemplary embodiment of a traction power supply system.

FIG. 4 illustrates a further exemplary embodiment of a traction power supply system 1, wherein compared to FIG. 3 the switching element 15 is omitted. It is furthermore indicated that the one MOSFET 11 of the switching element 17 that is illustrated in dashed lines can be omitted since negative repercussions from the DC-DC converter 2 on the rest of the high-voltage side HV are of no concern such that the parasitic diode does not let through any disruptive current for the high-voltage side HV.

Figure 5:
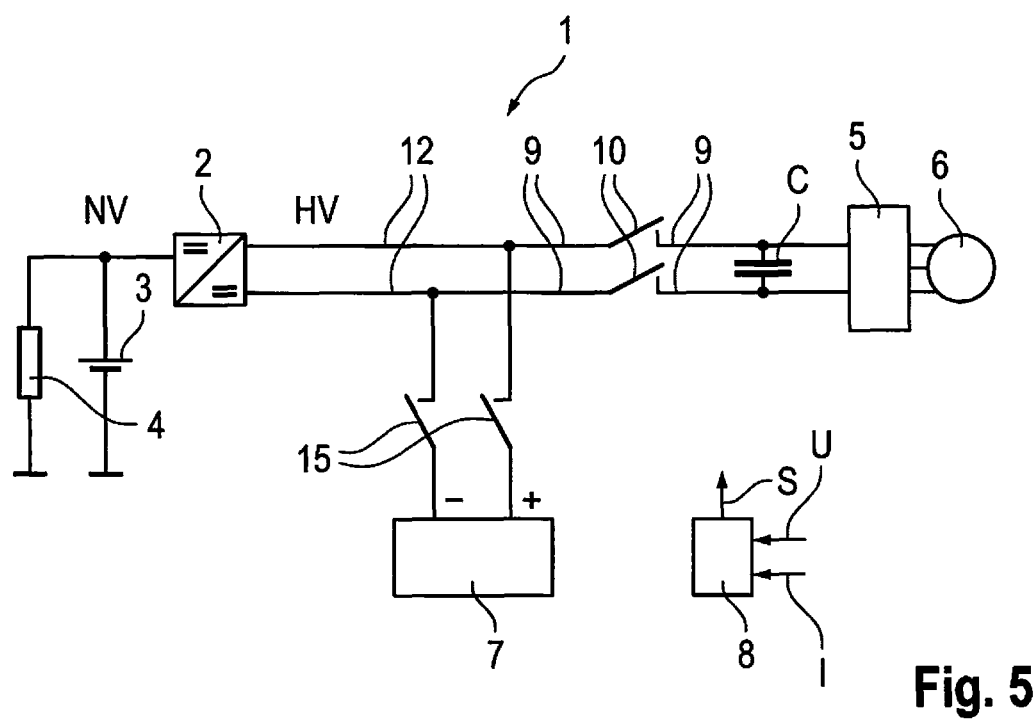
FIG. 5 is a fifth exemplary embodiment of a traction power supply system.

FIG. 5 illustrates a further exemplary embodiment, wherein the high-voltage loads 13 are not illustrated here for the sake of clarity. In this case, the switching elements 10, 15 are designed as relays 18, wherein the disconnection takes place in each case in an all-pole manner. The high-voltage battery 7 has, for example, a nominal voltage of 400 V. The defective part of the high-voltage side HV can be disconnected via the switching elements 10, wherein the high-voltage battery 7 can be disconnected via the switching elements 15 in the event of a defect. To precharge the intermediate circuit capacitor C or to supply power to the low-voltage side from the electrical machine 6 in the event of a defective high-voltage battery 7, the switching elements 10 are closed and the switching elements 15 are opened. The DC-DC converter 2 is a galvanically isolated DC-DC converter 2. Switching elements can also optionally be provided at the DC/DC converter 2.

LIST OF REFERENCE SIGNS

1 Traction power supply system
2 DC-DC converter
3 Low-voltage battery
4 Low-voltage load
5 Inverter
6 Electrical machine
7 High-voltage battery 8 Control device
9 Connection line
Switching element
11 MOSFET
12 Connection line
13 High-voltage load
14 Defect
15 Switching element
16 Connection line
17 Switching element
18 Relay

The invention claimed is:

1. A traction power supply system of an electric or hybrid transportation vehicle configured to detect and prevent repercussions of a defect on a high-voltage side of the traction power supply system, the traction power supply system comprising:
    a high-voltage side that includes at least one electrical machine, an inverter and a high-voltage battery;
    a low-voltage side;
    at least one DC-DC converter connecting the high-voltage side to the low-voltage side, wherein the high-voltage battery is assigned at least one switching element arranged in at least one connection line between the high-voltage battery and the inverter; and
    at least one control device that is a battery management control device of the high-voltage battery and controls the at least one switching element,
    wherein the high-voltage battery is connected to the at least one DC-DC converter via at least one further connection line,
    wherein a third connecting line is arranged between the DC/DC converter and the inverter,
    wherein at least one further switching element is arranged in the third connecting line, wherein the control device further controls the at least one further switching element, and
    wherein switching off is controlled by the control device either in a single-pole manner or an all-pole manner depending a nominal voltage of the high-voltage battery to eliminate repercussions of the defect on the high-voltage side on the rest of the traction power supply system.

2. The traction power supply system of claim 1, wherein the control device controls opening the at least one switching element in response to detection of a defect of the electrical machine and/or the inverter and/or of a further high-voltage load while maintaining electrical connection between the high-voltage battery and the DC-DC converter.

3. The traction power supply system of claim 1, wherein at least one further switching element is arranged in the further connection line between the high-voltage battery and the DC/DC converter.

4. The traction power supply system of claim 3, wherein at least the at least one switching element and the at least one further switching element are each two MOSFETs connected in series in opposite directions.

5. The traction power supply system of claim 1, wherein the DC-DC converter is a bidirectional DC-DC converter.

6. The traction power supply system of claim 1, wherein the at least one switching element is a relay.

7. The traction power supply system of claim 1, wherein the at least one switching element is a MOSFET.

8. The traction power supply system of claim 1, wherein the high-voltage battery has a nominal voltage less than 60 V.

9. The traction power supply system of claim 1, wherein the high-voltage battery has a nominal voltage of greater than 60 V.

10. A method for controlling a traction power supply system of an electric or hybrid transportation vehicle configured to detect and prevent repercussions of a defect on a high-voltage side of the traction power supply system, wherein the traction power supply system has both the high-voltage side and a low-voltage side, wherein at least one electrical machine, an inverter and a high-voltage battery are arranged on the high-voltage side, wherein the high-voltage side is connected to the low-voltage side via at least one DC-DC converter, the method comprising:
    controlling at least one switching element assigned to the high-voltage battery by at least one control device of the traction power supply system, wherein the control device is a battery management control device of the high-voltage battery, wherein the at least one switching element is arranged in a connection line between the high-voltage battery and the inverter, wherein the high-voltage battery is connected to the DC-DC converter via a further connection line;
    opening the at least one switching element under the control of the control device opens the at least one switching element in response to detection of a defect of the electrical machine and/or the inverter and/or of a further high-voltage load while maintaining electrical connection between the high-voltage battery and the DC-DC converter,
    wherein a third connecting line is arranged between the DC/DC converter and the inverter, and
    wherein at least one further switching element is arranged in the third connecting line, wherein the control device further controls the at least one further switching element, and
    wherein switching off is controlled by the control device either in a single-pole manner or an all-pole manner depending a nominal voltage of the high-voltage battery to eliminate repercussions of the defect on the high-voltage side on the rest of the traction power supply system.

11. The method of claim 10, wherein at least one further switching element is arranged in the further connection line between the high-voltage battery and the DC/DC converter.

12. The method of claim 11, wherein at least the at least one switching element and the at least one further switching element are each two MOSFETs connected in series in opposite directions.

13. The method of claim 10, wherein the DC-DC converter is a bidirectional DC-DC converter.

14. The method of claim 10, wherein the at least one switching element is a relay.

15. The method of claim 10, wherein the at least one switching element is a MOSFET.

16. The method of claim 10, wherein the high-voltage battery has a nominal voltage of less than 60 V.

17. The method of claim 10, wherein the high-voltage battery has a nominal voltage of greater than 60 V.

18. A traction power supply system of an electric or hybrid transportation vehicle configured to detect and prevent repercussions of a defect on a high-voltage side of the traction power supply system, the traction power supply system comprising:
    a high-voltage side that includes at least one electrical machine, an inverter and a high-voltage battery;
    a low-voltage side;

at least one DC-DC converter connecting the high-voltage side to the low-voltage side, wherein the high-voltage battery is assigned at least one switching element arranged in at least one connection line between the high-voltage battery and the inverter; and at least one control device that controls the at least one switching element, wherein the high-voltage battery is connected to the at least one DC-DC converter via at least one further connection line, wherein opening the at least one switching element under the control of the at least one control device opens the at least one switching element in response to detection of a defect of the electrical machine and/or the inverter and/or of a further high-voltage load while maintaining electrical connection between the high-voltage battery and the DC-DC converter, and wherein, in response to a detected defect in the electric machine and/or the inverter and/or one further high-voltage consumer, the control device opens the at least one switching element while the electrical connection between the high-voltage battery and the DC/DC converter is maintained to eliminate repercussions of the defect on the high-voltage side on the rest of the traction power supply system.

19. A method for controlling a traction power supply system of an electric or hybrid transportation vehicle configured to detect and prevent repercussions of a defect on a high-voltage side of the traction power supply system, wherein the traction power supply system has both the high-voltage side and a low-voltage side, wherein at least one electrical machine, an inverter and a high-voltage battery are arranged on the high-voltage side, wherein the high-voltage side is connected to the low-voltage side via at least one DC-DC converter, the method comprising:

controlling at least one switching element assigned to the high-voltage battery by at least one control device of the traction power supply system, wherein the at least one switching element is arranged in a connection line between the high-voltage battery and the inverter, wherein the high-voltage battery is connected to the DC-DC converter via a further connection line;

opening the at least one switching element under the control of the at least one control device opens the at least one switching element in response to detection of a defect of the electrical machine and/or the inverter and/or of a further high-voltage load while maintaining electrical connection between the high-voltage battery and the DC-DC converter, wherein, in response to a detected defect in the electric machine and/or the inverter and/or one further high-voltage consumer, the control device opens the at least one switching element while the electrical connection between the high-voltage battery and the DC/DC converter is maintained to eliminate repercussions of the defect on the high-voltage side on the rest of the traction power supply system.

* * * * *